(12) United States Patent
Shigapov et al.

(10) Patent No.: US 6,893,998 B2
(45) Date of Patent: May 17, 2005

(54) EXHAUST GAS CATALYST AND METHOD OF MANUFACTURING SAME

(75) Inventors: Albert Nazipovich Shigapov, Aachen (DE); George Wade Graham, Ann Arbor, MI (US); Haren Sakaral Gandhi, West Bloomfield, MI (US); Hung-Wen Jen, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 295 days.

(21) Appl. No.: 10/144,507

(22) Filed: May 13, 2002

(65) Prior Publication Data

US 2003/0004060 A1 Jan. 2, 2003

Related U.S. Application Data

(63) Continuation-in-part of application No. 09/511,592, filed on Feb. 23, 2000, now abandoned.

(51) Int. Cl.[7] ............................ B01J 23/40; B01J 23/42; B01J 23/44; B01J 23/00
(52) U.S. Cl. ........................ 502/327; 502/302; 502/303; 502/304; 502/326; 502/333; 502/334; 502/339; 502/349; 502/439
(58) Field of Search ................................. 502/302, 303, 502/304, 349, 326, 327, 333, 334, 339, 439, 242, 261, 262

(56) References Cited

U.S. PATENT DOCUMENTS

| | | |
|---|---|---|
| 1,783,396 A | 12/1930 | Travers et al. |
| 3,533,964 A | 10/1970 | Rochow |
| 3,899,444 A | 8/1975 | Stephens |
| 4,113,651 A | 9/1978 | Chornet et al. |
| 4,169,874 A | 10/1979 | Bambrick |
| 4,277,376 A | 7/1981 | Paolasini |
| 4,353,854 A | 10/1982 | Oyamada et al. |
| 4,492,769 A | 1/1985 | Blanchard et al. |
| 4,504,598 A | 3/1985 | Ono et al. |
| 4,537,818 A | 8/1985 | Quinby |
| 4,604,228 A | 8/1986 | Perroud et al. |
| 4,619,909 A | 10/1986 | Ono et al. |

(Continued)

FOREIGN PATENT DOCUMENTS

| | | |
|---|---|---|
| EP | 0 287 217 A | 10/1988 |
| EP | 0 870 543 A | 4/1997 |
| EP | 0 786 284 A | 7/1997 |
| EP | 0 827 775 A | 3/1998 |
| JP | 9040425 | 2/1997 |
| WO | WO 93/15834 | 8/1993 |
| WO | WO 98/13139 | 4/1998 |
| WO | WO 98/42437 | 10/1998 |

OTHER PUBLICATIONS

"Use Of Praseodymia for Oxygen Storage in Automotive Catalysts", by G.W. Graham et al, pp. 1–10.

(Continued)

*Primary Examiner*—Cam N. Nguyen
(74) *Attorney, Agent, or Firm*—Brooks Kushman P.C.; Damian Porcari

(57) ABSTRACT

An exhaust gas catalyst and method of manufacturing same. The invention provides for a cost-effective material which lowers the cold-start emissions from the exhaust of vehicles. The invention is a passive system which accelerates the light-off temperature of catalyst in a cost-effective fashion. The invention includes a method of manufacturing an exhaust gas catalyst capable of lowering cold-start emissions including the steps of providing an oxide mixture having praseodymium and cerium, doping about 0–10% weight zirconium and about 0–10% weight yttrium to the oxide mixture, adding about 0–2% weight metal including palladium, platinum, or rhodium to the oxide mixture, mixing gamma aluminum to the oxide mixture for washcoating and washcoating the oxide mixture onto a monolithic substrate.

7 Claims, 4 Drawing Sheets

| Pr : Ce : Zr | BET surface area (m²/g) | | a (nm) |
|---|---|---|---|
| | fresh[a] | air aged[b] | |
| 0.45:0.45:0.10 | 118 | 8.1 | 0.541 |
| 0.425:0.425:0.15 | 103 | 11.2 | 0.540 |
| 0.40:0.40:0.20 | 121 | 15.1 | 0.539 |

[a] - 650 C for 2 h
[b] - 1050 C for 12 h

U.S. PATENT DOCUMENTS

| | | |
|---|---|---|
| 4,678,770 A | 7/1987 | Wan et al. |
| 4,714,694 A | 12/1987 | Wan et al. |
| 4,808,564 A | 2/1989 | Matsumoto et al. |
| 4,849,398 A | 7/1989 | Takada et al. |
| 4,925,647 A | 5/1990 | Kirchhofer |
| 4,996,031 A | 2/1991 | Spooner et al. |
| 5,081,102 A | 1/1992 | Gay et al. |
| 5,169,300 A | 12/1992 | Chou et al. |
| 5,182,249 A | 1/1993 | Wang et al. |
| 5,183,608 A | 2/1993 | Guile |
| 5,248,650 A | 9/1993 | Sekiba et al. |
| 5,294,421 A | 3/1994 | Muraki et al. |
| 5,310,525 A | 5/1994 | Churchouse et al. |
| 5,358,695 A | 10/1994 | Helble et al. |
| 5,468,266 A | 11/1995 | Bensalem et al. |
| 5,468,427 A | 11/1995 | Stangle et al. |
| 5,505,865 A | 4/1996 | Kumar et al. |
| 5,556,825 A | 9/1996 | Shelef et al. |
| 5,568,652 A | 10/1996 | Wu |
| 5,595,577 A | 1/1997 | Bensalem et al. |
| 5,597,771 A * | 1/1997 | Hu et al. .................. 502/304 |
| 5,630,974 A | 5/1997 | Rose et al. |
| 5,635,154 A | 6/1997 | Arai et al. |
| 5,814,576 A * | 9/1998 | Yamamoto .................. 502/303 |
| 5,830,242 A | 11/1998 | Yao |
| 5,878,567 A | 3/1999 | Adamczyk, Jr. et al. |
| 5,898,014 A * | 4/1999 | Wu et al. .................. 502/302 |
| 5,948,723 A | 9/1999 | Sung |
| 5,976,476 A * | 11/1999 | Blanchard et al. ....... 423/213.2 |
| 5,989,507 A * | 11/1999 | Sung et al. ............. 423/213.5 |
| 6,040,265 A * | 3/2000 | Nunan ....................... 502/242 |
| 6,044,644 A | 4/2000 | Hu et al. |
| 6,107,240 A * | 8/2000 | Wu et al. .................. 502/304 |
| 6,139,814 A | 10/2000 | Shigapov et al. |
| 6,171,572 B1 * | 1/2001 | Aozasa .................. 423/594.12 |
| 6,180,075 B1 | 1/2001 | Lindner et al. |
| 6,214,306 B1 * | 4/2001 | Aubert et al. ........... 423/213.2 |
| 6,214,307 B1 | 4/2001 | Okumura et al. |
| 6,228,799 B1 * | 5/2001 | Aubert et al. .............. 502/304 |
| 6,248,688 B1 * | 6/2001 | Wu et al. .................. 502/302 |
| 6,294,140 B1 | 9/2001 | Mussmann et al. |
| 6,326,329 B1 * | 12/2001 | Nunan ...................... 502/242 |
| 6,355,220 B1 * | 3/2002 | Blanchard et al. ....... 423/242.1 |
| 2002/0032123 A1 | 3/2002 | Shigapov et al. |

OTHER PUBLICATIONS

"Oxygen Availability in Mixed Cerium/Praseodymium Oxides and the Effect of Noble Metals", by A.D. Logan et al, J. Mater. Res., vol. 9, No. 2, Feb. 1994, pp. 468–475.

"Kinetic and Structural Studies of Oxygen Availability of the Mixed Oxides $Pr_{1-x}M_xO_y$ (M =Ce,Zr)", by M.Yu. Sinev, J. Mater. Res., vol. 11, No. 8, Aug. 1996, pp. 1960–1971.

"Sol–Gel Precursors and the Oxygen Storage Capacity of $PrO_y$–$ZrO_2$ Materials", by C.K. Narula et al, Mat. Res. Soc. Symp. Proc. vol. 497, 1998 Materials Research Society, pp. 15–20.

"An Examination of Praseodymia as an Oxygen–Storage Component in Three–way Catalysts", by E.S. Putna et al, Catalysis Letters 54 (1998), pp. 17–21.

"Characterization of Model Automotive Exhaust Catalysts: Pd on Ceria and Ceria–Zirconia Supports", by H.W. Jen et al, Catalysis Today 50 (1999), pp. 309–328.

"Evaluation of Low–Grade Ceria as a Pd–Catalyst Support Material", by R.W. McCabe et al, Applied Catalysis a: General 184 (1999), pp. 265–272.

"Single–Phase $PrO_y$–$ZrO_2$ Materials and Their Oxygen Storage Capacity: A Comparison with Single–Phase $CeO_2$–$ZrO_2$, and $PrO_y$–$CeO_2$–$ZrO_2$ Materials", C.K. Narula et al, Journal of Physical Chemistry B, vol. 103, No. 18 (1999), pp. 3634–3639.

"Sol–gel Processed Fluorite–Structured $PrO_y$–$ZrO_2$ Mixed Oxides Deposited on Alumina", by C.K. Narula et al, J. Mater. Chem., 1999, 9, pp. 1155–1159.

"Development of Low Light–off Three Way Catalyst", by Satoshi Ichikawa et al, SAE Technical Paper No. 1999–01–0307, Mar. 1–4, 1999, pp. 1–7.

"Thermally Stable, High–Surface–Area, $PrO_y$–$CeO_2$–Based Mixed Oxides for use in Automotive–Exhaust Catalysts", by A.N. Shigapov et al, 1999, 5 pp.

* cited by examiner

| Pr : Ce : Zr | BET surface area (m²/g) | | a (nm) |
|---|---|---|---|
| | fresh[a] | air aged[b] | |
| 0.45:0.45:0.10 | 118 | 8.1 | 0.541 |
| 0.425:0.425:0.15 | 103 | 11.2 | 0.540 |
| 0.40:0.40:0.20 | 121 | 15.1 | 0.539 |

[a] - 650 C for 2 h
[b] - 1050 C for 12 h

| | EVALUATION TEMPERATURE (°C) | | | | | | |
|---|---|---|---|---|---|---|---|
| Pr : Ce : Zr | 50 | 100 | 150 | 200 | 250 | 300 | 350 |
| 0.45:0.45:0.10 | 41(12) | 206(13) | 232(35) | 323(148) | 503(283) | 635(445) | 646(610) |
| 0.40:0.40:0.20 | 43(2) | 153(18) | 213(41) | 292(152) | 406(248) | 492(393) | 545(545) |
| 0.31:0.31:0.38 | 23(1) | 49(31) | 74(24) | 104(61) | 194(145) | 324(271) | 436(442) |
| 0.62:0.38 | 39(33) | 66(44) | 56(51) | 149(93) | 323(281) | 598(582) | 772(771) |

EXHAUST GAS CATALYST AND METHOD OF MANUFACTURING SAME

CROSS-REFERENCE TO RELATED APPLICATIONS

This application is a continuation-in-part of U.S. application Ser. No. 09/511,592, filed Feb. 23, 2000, now abandoned.

BACKGROUND OF THE INVENTION

1. Field of the Invention

This invention relates to an exhaust gas catalyst capable of lowering cold-start emissions and a method of manufacturing the exhaust gas catalyst.

2. Background Art

The need to lower vehicle exhaust emissions continues to create challenges, especially in the wake of stringent environmental regulations. The need to lower cold-start emissions is at the heart of most emissions reduction strategy, since cold-start emissions account for a significant portion of exhaust emissions from any given vehicle. During startup, hydrocarbons can be passed through the exhaust system before the catalyst can heat up and convert the hydrocarbons to more desirable gases. Although a large portion of hydrocarbons are reduced, an amount of hydrocarbons and other undesirable gases may be allowed to pass through the exhaust system without reduction thereof.

One solution to the cold-start emission problem is providing a material that is able to give off oxygen to the catalyst during startup conditions such that the "light-off" temperature of the catalyst is accelerated. The light-off temperature is the temperature at which the catalyst reacts with hydrocarbons and other exhaust gases to reduce these gases, which are undesirable, to more desirable gases such as carbon dioxide. Oxygen, when fed to the catalyst, creates an exothermic reaction to the catalyst, resulting in increased temperature which allows the catalyst to reach the light-off temperature more quickly.

Currently, palladium is used with a cerium-zirconium mixed oxide support, an aluminum oxide support, or a mixture thereof to give off oxygen at startup conditions (low temperature), in order to accelerate light-off of the catalyst. However, palladium is an extremely expensive material which typically contributes to approximately 95% of the total cost of the catalyst. Recent studies have thus focused on methods and materials to reduce the consumption of palladium while providing an effective means for accelerating the light-off temperature of the catalyst.

The use of additional hardware has also been proposed to solve the cold-start problem. In some cases, the additional hardware allows the exhaust system catalyst to be heated directly in order to accelerate light-off of the catalyst. For example, an electrically heated catalyst may be used where the catalyst is heated directly by an electric heater. Prior to startup, current is run through the heater via the vehicle battery, and the heat produced accelerates light-off of the catalyst and, in turn, lowers the cold-start emissions.

Another example of an active approach is to allow fuel to combust near the catalyst to quickly raise the temperature thereof. This is accomplished by running lines and having an ignition system disposed on the vehicle. Generally, systems that incorporate additional hardware, such as the examples mentioned above, result in high costs for implementation.

Thus, what is needed is a cost effective solution to the cold-start emissions problem.

DISCLOSURE OF INVENTION

Accordingly it is an object of the present invention to provide a cost effective material which lowers the cold-start emissions from the exhaust of vehicles.

It is another object of the present invention to provide a passive system which accelerates the light-off temperature of catalysts in a cost-effective fashion.

Yet another object of this invention is to provide a method of manufacturing an exhaust gas catalyst capable of lowering cold-start emissions through a three-way catalyst including mixed metal oxides.

The method provides an exhaust gas catalyst having an oxide mixture with substantially equal molar content of praseodymium and cerium, doping about 0 to 10 weight % zirconium and about 0–10 weight % yttrium to the oxide mixture by combining suitable precursors in a liquid solution before oxide formation, and adding or doping about 0–2 weight % precious metal including palladium, platinum, or rhodium to the oxide mixture. The method further involves mixing gamma alumina to the oxide mixture for washcoating, and washcoating the mixture onto a monolithic substrate.

Another specific object of this invention is an exhaust gas catalyst supported on a monolithic substrate in which the catalyst is capable of lowering cold-start emissions. The catalyst comprises an oxide mixture which is formed by combining suitable precursors of praseodymium, cerium, and at least one metal selected from the group consisting of zirconium and yttrium, in a liquid solution before oxide formation, and which is washcoated on the monolithic substrate. The oxide mixture has substantially equal molar content of praseodymium and cerium. The oxide mixture also has about 0 to 10 weight % zirconium and about 0–10 weight % yttrium, and about 0–2 weight % precious metal which includes palladium, platinum, or rhodium.

In another object of this invention provides for a method of manufacturing an exhaust gas catalyst capable of lowering cold-start emissions through a three-way catalyst including mixed metal oxides.

The method provides an exhaust gas catalyst having an oxide mixture of praseodymium and cerium, doping about 0 to 10 weight % zirconium, about 0–10 weight % yttrium to the oxide mixture, and about 0–2 weight % precious metal including palladium, platinum, or rhodium to the oxide mixture. The method further involves mixing gamma alumina to the oxide mixture for washcoating, and washcoating the mixture onto a monolithic substrate.

In yet another embodiment of the invention, a method of making an oxygen storage material for automotive exhaust catalysts is provided wherein oxygen storage materials having a low temperature of oxygen release, such as praseodymia can be made thermally stable by an organic-templating method that incorporates low levels of zirconia, yttria and possibly other additives.

BEST MODE FOR CARRYING OUT THE INVENTION

Figures 1, 2, 3:
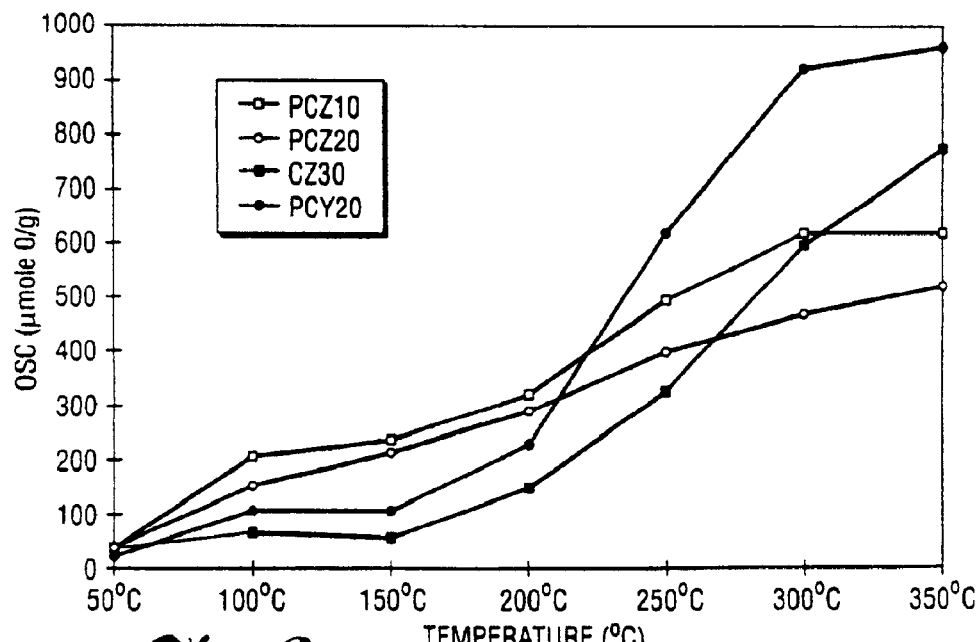
FIG. 1 is a table which shows the effect of surface area of mixed oxides as concentration of zirconium is increased in an equal molar concentration mixture of praseodymia and ceria.
FIG. 2 is another table which shows the oxygen storage capacities of mixed oxides as the concentration of zirconium is increased in an equal molar concentration mixture of praseodymia and ceria.
FIG. 3 is a graph which shows the oxygen storage capacities of mixed oxides having praseodymia verus mixed oxides without praseodymia.

The invention is a method for manufacturing an exhaust gas catalyst capable of lowering cold-start emission. More specifically, the method teaches the formation of high surface area, thermally stable oxygen storage materials for automotive exhaust catalysts. The method generally includes providing an oxide mixture having praseodymium and cerium, doping about 0–10 weight % zirconium and about 0–10 weight % yttrium to the oxide mixture, and adding about 0–2 weight % precious metal to the oxide mixture. The precious metal may include palladium, platinum, rhodium or mixture thereof. The method generally further includes mixing gamma alumina to the oxide mixture for washcoating and washcoating the mixture onto a monolithic substrate. As a result, a material may be manufactured that lowers cold-start emissions. The resulting material is an exhaust gas catalyst supported on a monolithic substrate in which the catalyst comprises a praseodymium-cerium oxide mixture washcoated on the monolithic substrate.

Throughout the specification, the term "oxide mixture" or "mixed oxide" refers to a solid solution mixed oxide, or alloy, rather than a physical mixture of single oxides.

A surprising and unexpected advantage of the present method is that the oxide mixture so produced has been found to have high surface area and high oxygen storage capacities at lower temperatures while consuming lower contents of metals such as palladium. As described below, the presence of zirconium with the praseodymium increases surface area stability of the oxide mixture. Such advantage provides for significant cost savings in manufacturing exhaust gas catalyst capable of lowering cold-start emissions through an exhaust stable catalyst, such as a three-way catalyst. The resultant praseodymium-cerium oxide mixture requires less metals to be added thereto in order to accelerate light-off of the catalyst. Thus, total consumption of palladium, platinum or rhodium will be reduced with implementation of the present invention method.

According to the present invention, an oxide mixture is provided having preferably substantially equal molar content of praseodymium and cerium. Alternatively, the oxide mixture may be of different molar contents of praseodymium and cerium, e.g., about 40%/60%, 60%/40%, respectively. The oxide mixture may be prepared by any suitable means. Preferably, the oxide mixture is prepared as described in U.S. patent application Ser. No. 08/966,729, entitled "Thermally Stable, High-Surface-Area Metal Oxides Made By Organic Templating", now U.S. Pat. No. 6,139,814, which is hereby incorporated by reference. Specifically, the oxide mixture is preferably prepared using a unique templating method, where the template is a porous structured organic material with a well-defined crystallinity or microcrystallinity. By "structured" is meant a well-defined pore structure which optimally, is relatively homogeneous throughout the organic material. It is believed that the method works to produce a porous metal oxide somewhat like a cast is made from a mold. That is, the organic template serves as the mold and the porosity of the template material helps determine the ultimate structure of the resulting metal oxide. The mold (i.e., pores of the organic template) is contacted with a liquid solution of metal salts or organometallic compounds (hereinafter "metal oxide precursors") that optimally essentially fill the pores, acting as the cast material. Subsequent heating then vaporizes and removes the liquid, leaving the metal oxide precursors adsorbed on the surface of the mold (i.e., the porous organic template material), and then further heating in air or some other gas containing oxygen at high temperatures combusts the mold while also converting the metal oxide precursors to their respective metal oxides. However other suitable ways of preparing the oxide mixture may be used, such as sol gel methods or precipitation methods do not fall beyond the scope and spirit of this invention.

The oxide mixture is then doped with zirconium, yttrium, or both to enhance the thermal stability of the high surface area oxide mixture.

Generally, between 0 to about 10 weight % zirconium and between 0 to about 10 weight % yttrium may be doped to the oxide mixture. As described below, it has been found that higher doses of zirconium may reduce the oxygen storage capacities of the oxide mixture. It is preferred that the least amount of zirconium be doped to the oxide mixture that achieves the desired characteristics.

In a preferred embodiment, 0–2 weight % zirconium and/or yttrium is doped to the oxide mixture. More specifically, it has been found that the addition of zirconia tends to promote an undesirable transformation of tetravalent praseodymia (Pr+4) to trivalent praseodymia (Pr+3) in the praseodymia-ceria mixed oxide. This was confirmed by thermal gravimetric analysis which showed that the amount of oxygen reversibility released upon heating from 200° to 800° celsius in air decreases with increasing levels of zirconia. Thus, only small portions of zirconium are preferably added in order to enhance stability of the surface area of the mixed oxides.

As shown in FIG. 1, oxide mixtures having substantially equal molar content of praseodymium and cerium increase in surface area as the levels of zirconium are increased in the mixtures thereof. Moreover, FIG. 1 shows that increased contents of zirconium in oxide mixtures having equal molar contents of praseodymium and cerium increase the surface area of the resulting oxide mixture for fresh or air aged oxide mixtures. The increase in surface area of the oxide mixtures with respect to zirconium illustrates their enhanced ability as catalyst support.

As shown in FIG. 2, increased levels of zirconium in oxide mixtures having equal molar content of praseodymium and cerium result in a decrease of the oxygen storage capacities of the resulting oxide mixtures. Moreover, FIG. 2 shows that as levels of zirconium increase in oxide mixtures, oxygen storage capacities of such oxide mixtures also decrease consistent with temperature. The decrease of oxygen storage capacities of the oxide mixtures illustrates an adverse effect of zirconium on catalyst support. Additionally, FIGS. 1 and 2 together illustrate the need to optimize the amounts of zirconium doped to the oxide mixture.

As shown in FIG. 3, resulting oxide mixtures having praseodymium at 100° to 250° celsius have typically higher oxygen storage capacities than the resulting oxide mixture without praseodymium contents. Additionally, FIG. 3 also shows that oxide mixtures having greater contents of zirconium typically have a lower oxygen storage capacity than oxide mixtures having less zirconium contents.

Doping of the oxide mixture with zirconium, yttrium, or both may be achieved according to the preparation of preparing oxide mixtures as described in our U.S. Pat. No. 6,139,814. Thus, according to the present invention, "doping" of a praseodymia-ceria oxide mixture with zirconium, yttrium, or both, is preferably achieved by dissolving the selected metal oxide precursors in solution. It will be appreciated that the metal oxide precursors may be selected from any precursor which will provide a metal or a metal compound on the templating material, which metal or compound is capable of converting to its metal oxide during the subsequent heating of the template material. The metals can be supplied via any salts that are soluble in the solvent. Nitrates are particularly suitable since they generally show good solubility in aqueous solution. Other common precursors which have been successfully used include organic salts such as citrates and acetylacetonates of the metal. By way of example only, where the oxide mixture is to be "doped" with zirconium, the precursors may be inorganic metal salts or organic metal complexes like zirconium nitrate, zirconium (IV) acetylacetonate, and zirconium (IV) citrate. Still other metal oxide precursors will be apparent to those skilled in the art in view of the present disclosure.

As we teach in our U.S. Pat. No. 6,139,814, the solvent used in preparing the desired liquid solution of metal oxide precursors can be any liquid which is capable of both dissolving the metal precursors and being absorbed by the organic template material. Although organic solvents, such as alcohols, ethers, and ketones can be used, water is the most convenient and preferred solvent. Even in cases where the metal precursors have limited solubility in water, it is often possible to increase solubility through the addition of citric acid to the aqueous solution of metal salts. The citric acid reacts with the metal salts to form citrate complexes which have a high solubility in water. This allows the preparation of mixed oxide materials from more highly concentrated solutions of metal salts than would otherwise be possible. Another method for improving the solubility of precursor salts is to heat the solution to between 50–100° C., preferably to about 75–80° C. It should also be noted that the technique works best in either acidic or neutral mediums.

After the oxide mixture is doped, precious metal is added to the oxide mixture. Generally, 0–2 weight % precious metal is added to the oxide mixture. Specifically, the precious metals which may be added include palladium, platinum or rhodium. Preferably, 0.1 to 1.5 weight % of metal may be added to the oxide mixture. Moreover, a combination of the three precious metals may be added at any suitable ratios. Addition of the precious metal may be performed by impregnating the oxide mixture therewith, as known in the art.

It has been found that if precious metal is added to the mixed oxide at the time the mixed oxide is made, i.e., with the precious metal precursors being added to the liquid solution of metal oxide precursors prior to templating, then oxygen storage capacities and surface areas of the resulting solid solution oxide mixture are typically higher than when precious metal is added at a time after the oxide is made. Thus, it is preferred that the precious metal be added to the oxide mixture at the time the oxide mixture is prepared and doped. However, it is to be noted that adding precious metal at a later time does not fall beyond the scope and spirit of this invention.

Figure 4:
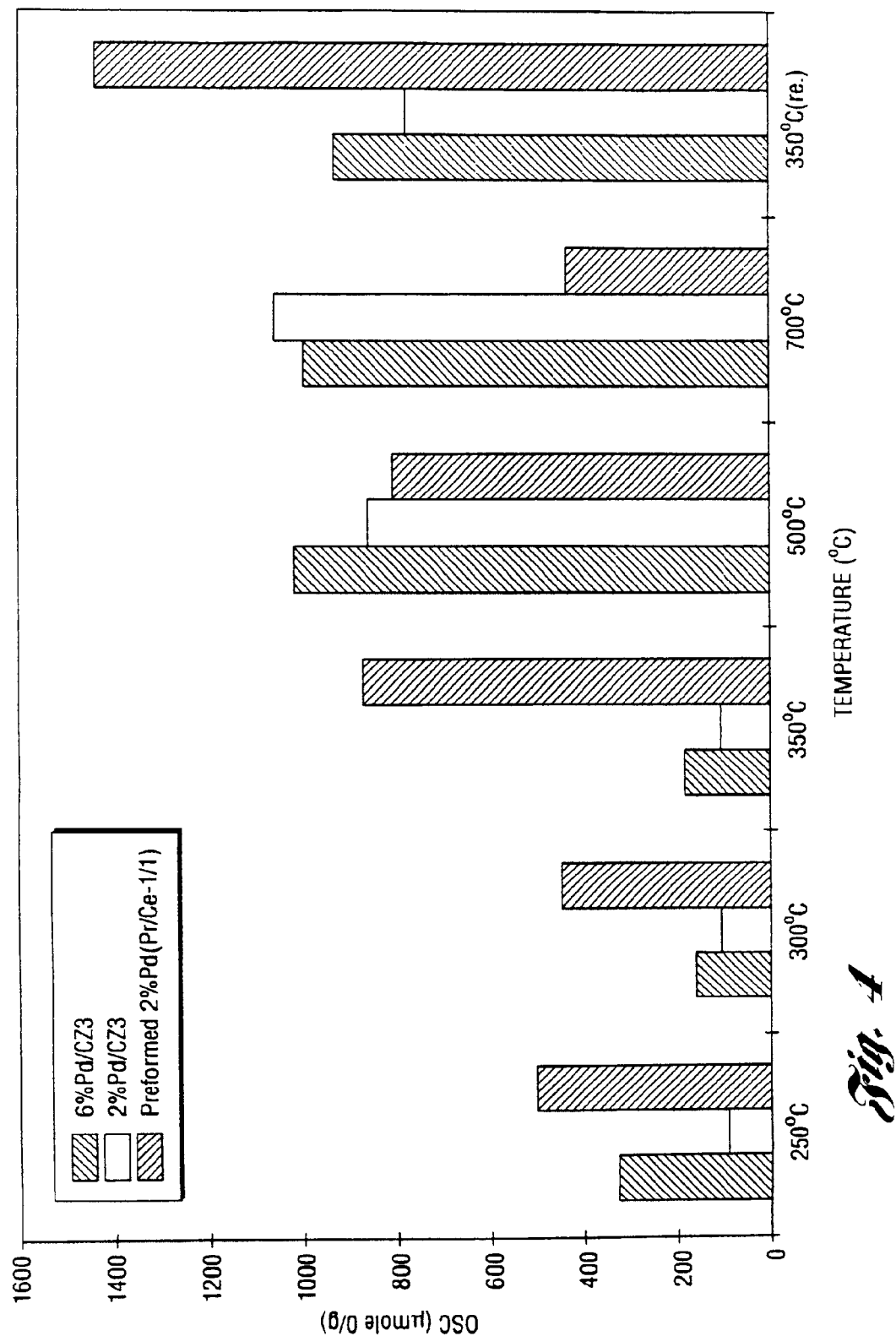
FIG. 4 is a bar graph which shows the oxygen storage capacities of mixed oxides having praseodymia and adding precious metal at the time the mixed oxide is made versus mixed oxides without praseodymia.

FIG. 4 illustrates that by providing an oxide mixture having praseodymium and by adding precious metals to the mixed oxide at the time the oxide mixture is made, a catalyst with higher oxygen storage capacity at low temperatures is obtained. As shown in FIG. 4, a catalyst having praseodymium has a higher oxygen storage capacity than catalysts without praseodymium. In turn, less precious metals, such as palladium, are required to obtain a given oxygen storage capacity. A decrease in content of palladium per unit weight of catalyst results in a substantial cost savings in manufacturing exhaust gas catalysts.

After the precious metal is added, a binder may be used such as zirconia, nitrates of ceria or praseodymia, and possibly gamma alumina. The binder would be mixed with the oxide mixture for washcoating. The use of a binder aids in bonding the contents to achieve a monolithic catalyst having increased oxygen storage capacities. As an example, gamma alumina may be mixed with the oxide mixture at about 0.1/1 to 1/1 in gamma alumina/oxide mixture molar ratios. It should be noted that a binder is not required to achieve the improved catalytic device of this invention. If a binder is used, the preferred binders are zirconia and nitrates of ceria and praseodymia. It is further believed that when gamma alumina is used as a binder for the present invention, gamma alumina converts into an aluminate-reducing the oxygen storage capacity of the catalyst.

As known, there are a number of ways to mix a binder with the oxide mixture for washcoating. All of such known methods may be used in this invention for such purpose and do not fall beyond the scope and spirit of this invention.

The resulting oxide mixture may then be washcoated onto a monolithic substrate. As known, there are a number of ways to washcoat the mixture onto the monolithic substrate. Any such methods may be used for this purpose and do not fall beyond the scope and spirit of this invention. Among the list of known methods, there is included dipping the washcoat into a slurry containing the oxide mixture, and blowing the resulting oxide mixture onto the washcoat, etc.

The substrate typically may be a substrate including cordierite substrate or metallic substrate. The additional weight of the resulting oxide mixture to be washcoated onto the substrate is about 30%–50% of the weight of the initial substrate.

EXAMPLE 1

Praseodymium-cerium oxide mixture is prepared at equally molar contents, specifically 45 weight percent each. Ten weight percent zirconium is doped to the oxide mixture and 2 weight percent palladium was added thereafter. Gamma alumina is then mixed to the oxide mixture for washcoating and the oxide mixture is then washcoated onto a monolithic substrate, specifically cordierite substrate.

EXAMPLE 2

Praseodymium-cerium oxide mixture is prepared at equally molar contents, specifically 42.5 weight percent each. Fifteen weight percent zirconium was doped to the oxide mixture and 2 weight percent palladium is added thereafter. Gamma alumina is then mixed to the oxide mixture for washcoating and the oxide mixture is then washcoated onto a monolithic substrate, specifically cordierite substrate.

EXAMPLE 3

Praseodymium-cerium oxide mixture is prepared at equally molar contents, specifically 40 weight percent each.

Twenty weight percent zirconium is doped to the oxide mixture and 2 weight percent palladium was added thereafter. Gamma alumina is then mixed to the oxide mixture for washcoating and the oxide mixture is then washcoated onto a monolithic substrate, specifically cordierite substrate.

EXAMPLE 4

Praseodymium-cerium oxide mixture is prepared at equally molar contents, specifically 31 weight percent each. Thirty-eight weight percent zirconium is doped to the oxide mixture and 2 weight percent palladium was added thereafter. Gamma alumina is then mixed to the oxide mixture for washcoating and the oxide mixture is then washcoated onto a monolithic substrate, specifically cordierite substrate.

EXAMPLE 5

A catalyst, made by washcoating a cordierite monolithic support with Pd loaded onto a solid solution praseodymium-cerium oxide mixture containing approximately equal amounts of praseodymium and cerium, was incorporated into a vehicle exhaust system in a close-coupled position approximately 18 inches from the engine exhaust manifold.

Figure 5:
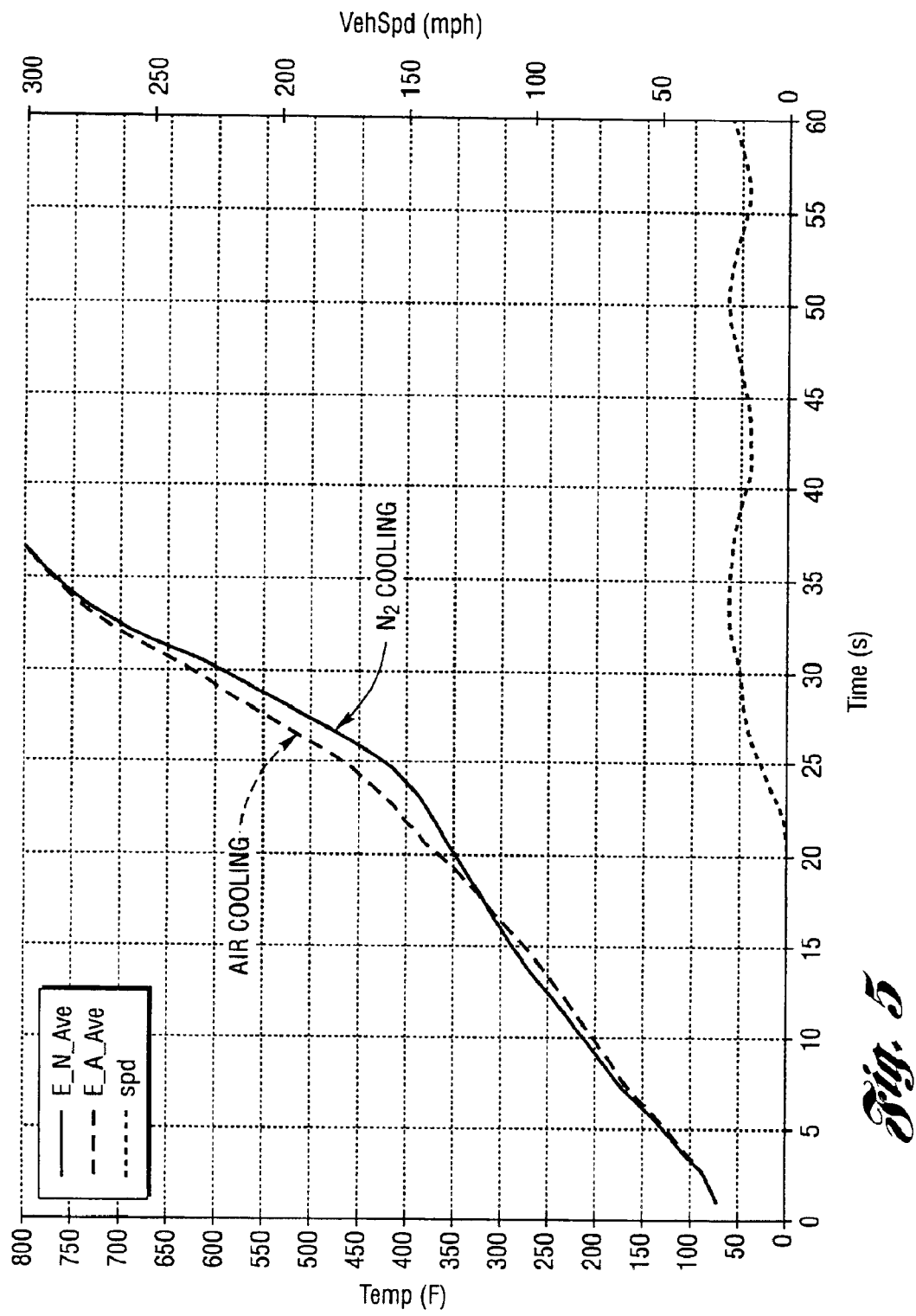
FIG. 5 is a graph which shows the average catalyst temperature as a function of time following cold start of mixed oxides having praseodymia and ceria in approximately equal molar concentration.
Figure 6:
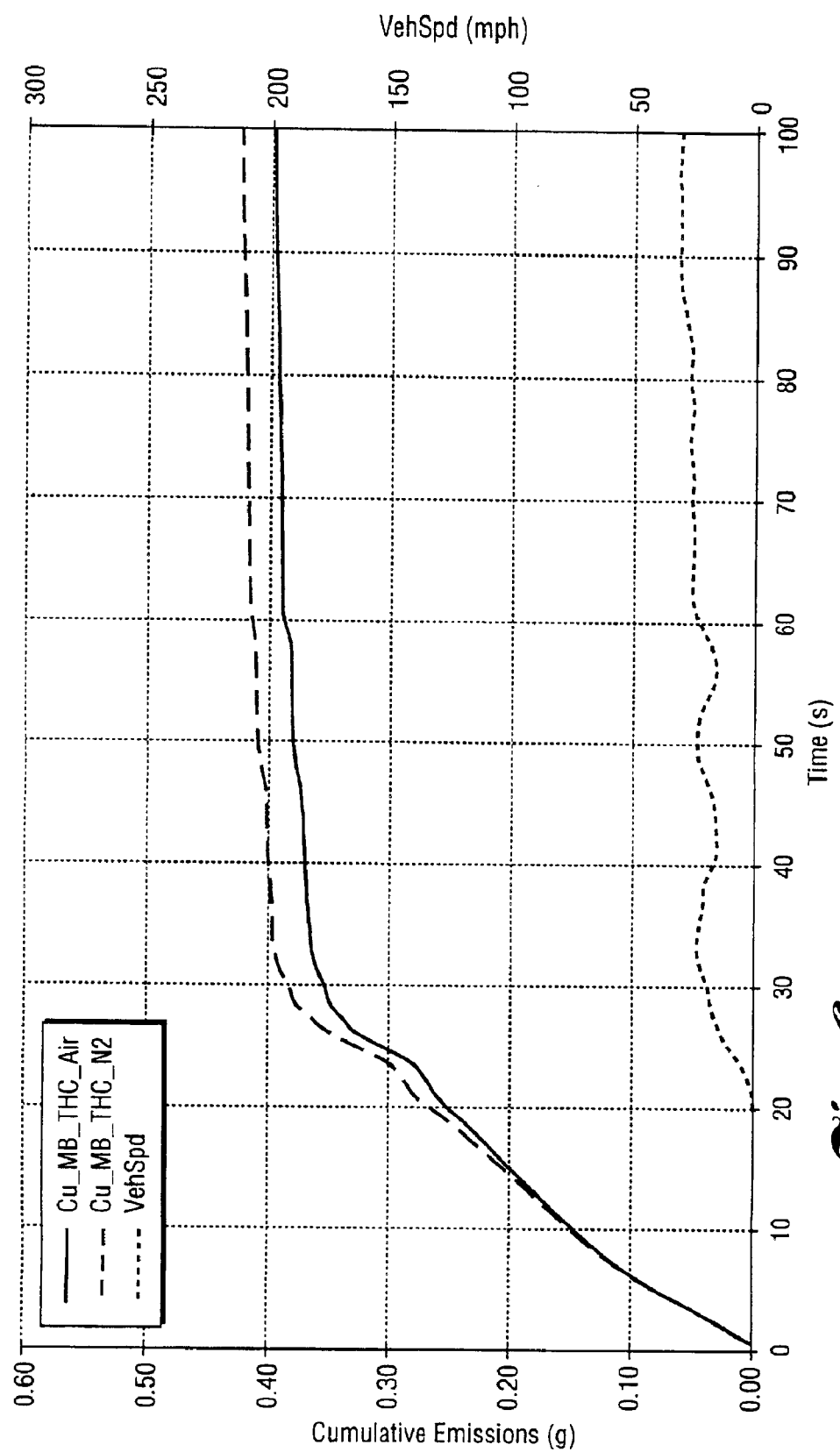
FIG. 6 is a graph which shows how the increased catalyst temperature (of the mixed oxides used in FIG. 5) corresponds to increased conversion of reductants in the exhaust gas, as shown for total hydrocarbons (THC).

Emissions data, together with the catalyst temperature, were acquired during dynamometer tests performed according to the standard Federal Test Procedure, FTP-75. Additionally, as shown in FIG. 5, in order to demonstrate the ability of the catalyst to store and release oxygen for the purpose of accelerating catalyst light-off, either air or nitrogen was passed over the catalyst during catalyst cool-down prior to each test. Four tests were performed with each pretreatment. The average catalyst temperature for both air cooling and nitrogen cooling, together with vehicle speed, are plotted as a function of time following cold start in FIG. 5. It is apparent that between approximately 18 and 35 seconds into the test, the catalyst temperature is higher following air cooling than nitrogen cooling. The increased catalyst temperature corresponds to increased conversion of reductants in the exhaust gas, as shown for total hydrocarbons (THC) from a pair of tests in FIG. 6. Consequently, the THC emissions collected in Bag 1 for FTP-75 (which includes cold-start) are lower for the air than the nitrogen pretreatments as shown in Table 1 below, which compares the averages of all four tests.

TABLE 1

Bag 1 emissions of THC in grams/mile.

| Air pretreatment | Nitrogen pretreatment |
|---|---|
| 0.109 | 0.115 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An exhaust gas catalyst supported on a monolithic substrate, the catalyst comprising:

a solid solution oxide mixture formed from an aqueous solution including metal oxide precursors of praseodymium, cerium, and at least one metal selected from the group consisting of zirconium and yttrium, wherein the relative molar content of praseodymium to cerium is in the range of about 0.67:1 to about 1.5:1 the oxide mixture, and a precious metal added to the oxide mixture in an amount no greater than about 2 wt. %, the precious metal is selected from the group consisting of platinum, rhodium, palladium, and mixtures thereof.

2. The catalyst of claim 1, wherein the oxide mixture has praseodymium and cerium in substantially equal molar content, and zirconium in an amount no greater than about 10 wt. %.

3. The catalyst of claim 1, wherein the oxide mixture includes yttrium in an amount no greater than about 10 wt. %.

4. The catalyst of claim 1, wherein adding the precious metal includes mixing an aqueous precursor of the precious metal into a liquid solution.

5. The catalyst of claim 4, wherein the precious metal is added in an amount in the range of about 0.1–1.5 wt. %.

6. An exhaust gas catalyst supported on a monolithic substrate, the catalyst comprising:

a solid solution oxide mixture formed from an aqueous solution including metal oxide precursors of praseodymium, cerium, at least one metal selected from the group consisting of zirconium and yttrium, and a precious metal in an amount no greater than about 2 wt. %, wherein the relative molar content of praseodymium to cerium is in the range of about 0.67:1 to about 1.5:1 the oxide mixture.

7. The catalyst of claim 6, wherein the precious metal is selected from the group consisting of platinum, rhodium, palladium, and mixtures thereof.

* * * * *